United States Patent [19]

Arumugham

[11] 4,245,236
[45] Jan. 13, 1981

[54] CHROMINANCE TAKE-OFF CIRCUIT

[75] Inventor: Rangaswamy Arumugham, Acton, Mass.

[73] Assignee: GTE Products Corporation, Stamford, Conn.

[21] Appl. No.: 950,500

[22] Filed: Oct. 11, 1978

[51] Int. Cl.$^2$ ............................................. H04N 9/535
[52] U.S. Cl. ..................................................... 358/31
[58] Field of Search ........................... 358/31; 333/132

[56] References Cited
U.S. PATENT DOCUMENTS 4,074,321  2/1978  Miller ..................................... 358/31

*Primary Examiner*—Richard Murray
*Attorney, Agent, or Firm*—John A. Odozynski

[57] ABSTRACT

A chrominance take-off circuit effecting a transmission zero at a predetermined frequency approximately equal to one-half the chrominance subcarrier frequency. The circuit includes a capacitive branch coupled in series with a parallel RLC branch that is resonant at approximately the subcarrier frequency. At frequencies below the subcarrier frequency the RLC branch is equivalent to a series-connected resistance and inductance. At the predetermined frequency the magnitude of the impedance of the capacitive branch is substantially equal to the magnitude of the impedance of the equivalent inductance, resulting in maximum attenuation of luminance signals at the predetermined frequency.

14 Claims, 6 Drawing Figures

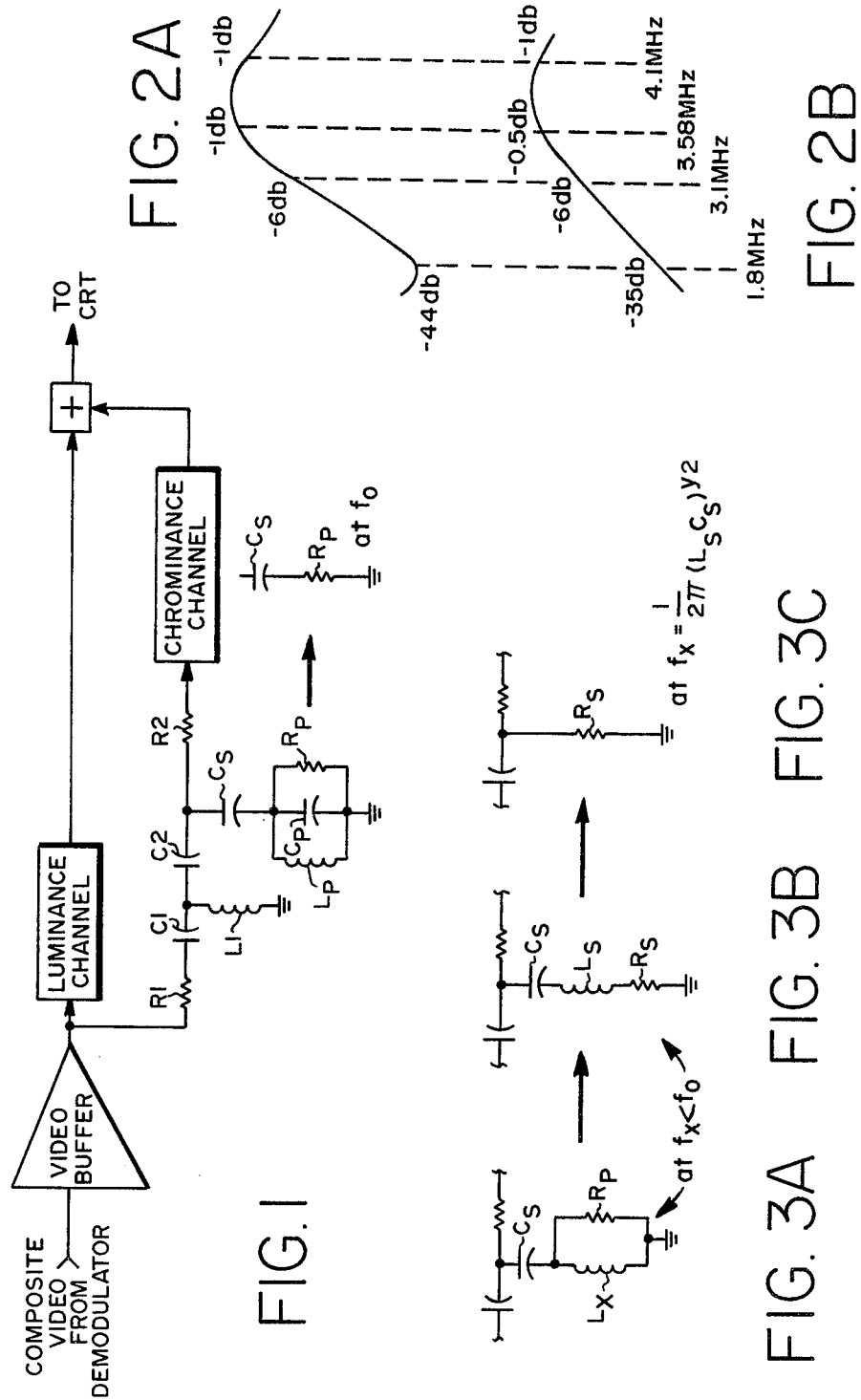

CHROMINANCE TAKE-OFF CIRCUIT

FIELD OF THE INVENTION

This invention relates to frequency-selective networks for electrical apparatus and more particularly to a chrominance take-off network for television receivers that effects substantially maximum transmission at one frequency and a transmission zero at a frequency below it.

BACKGROUND OF THE INVENTION

As is well known, in the NTSC color television system, luminance information in the demodulated composite video output is contained in the frequency band of approximately 0-4.1 MHz. The most commonly utilized chrominance information, on the other hand, occupies the bandwidth of approximately 3.1 MHz to 4.1 MHz. Frequency-selective chrominance take-off networks are used to couple chrominance information from the output of the composite video detector to the input of the chrominance processing circuitry. These networks are designed to both shape the overall chrominance frequency response curve as well as to provide attenuation of luminance information. If not sufficiently attenuated, luminance information in the chrominance channel will result in a contamination of the chrominance signal in the colored area of the reproduced video image. Such contamination, or cross-color as it is commonly referred to, can be particularly troublesome in receivers employing wideband chrominance processing circuitry. To this end chrominance take-off networks typically include one or two tuned circuits resonant at or near the chrominance subcarrier frequency (3.58 MHz) to attenuate luminance information. Although it may ordinarily be desirable to obtain as great an amount of luminance attenuation as practicable, the inclusion of additional tuned circuits having the required group delay characteristics at the subcarrier frequency can become economically prohibitive. The subject invention effects a substantially greater amount of luminance attenuation with minimum cost penalty. This is accomplished by including a single capacitive branch, coupled to a parallel resonant RLC branch of the take-off network. The capacitive branch and RLC branch effect a transmission zero at approximately one-half the chrominance subcarrier frequency, that is, at approximately 1.8 MHz. This is especially desirable since harmonics of the luminance signal may be generated during the processing of chrominance information. Consequently, the second harmonic of the luminance information within the frequency range of 1.5 to 2.0 MHz may be generated and fall directly within the chrominance channal bandwidth. In addition, the cross-color phenomenon is rendered more likely by the fact the NTSC signal typically contains approximately 20 db more information in the 1.0-2.0 MHz region of the luminance signal than in the chrominance sidebands. Furthermore, these effects are exacerbated by the additional attenuation (as much as 10 db) of the chrominance information due to the frequency response characteristic of conventionally designed IF amplifiers. Accordingly, a chrominance take-off circuit that provides additional attenuation of the luminance signal, particularly within the frequency range of 1.5 to 2.0 MHz, with a minimal additional cost, represents a significant improvement in television receiver design. The subject invention provides on the order of an additional 10 db attenuation of a 1.8 MHz luminance signal by adding a single capacitive branch to a prior art chrominance take-off network.

OBJECTS OF THE INVENTION

It is a primary object of this invention to implement an improved chrominance take-off network that effects maximum attenuation at luminance signal frequencies, thereby preventing contamination of the chrominance signal.

It is a further object of this invention to effect maximum attenuation of luminance signals at a frequency equal to approximately one-half the chrominance subcarrier frequency.

It is a further object of this invention to effect the above objects at the expense of a minimum additional incremental circuitry and cost.

SUMMARY OF THE INVENTION

These and other objects and advantages are achieved in one aspect of this invention by a chrominance take-off circuit comprising a capacitive branch coupled to a parallel RLC branch. At a frequency below its resonant frequency, the RLC branch is equivalent to a series-connected inductance and resistance. The circuit is so arranged that at a predetermined frequency the impedance of the equivalent inductance is equal to the impedance of the capacitive branch, thereby effecting a transmission zero at that frequency.

BRIEF DESCRIPTION OF THE DRAWINGS

FIG. 1 is a schematic diagram, partially embellished in block form, of the subject invention;

FIGS. 2A and 2B illustrate the frequency response characteristics of both a prior art chrominance take-off network and the improved take-off network of this invention; and FIGS. 3A, 3B, and 3C illustrate equivalent impedances presented at a frequency below the resonant frequency of a parallel RLC branch of the subject take-off network.

DESCRIPTION OF THE PREFERRED EMBODIMENT

For a better understanding of the present invention, together with other and further objects, advantages and capabilities thereof, reference is made to the following disclosure and appended claims in connection with the above description of some of the aspects of the invention.

As illustrated in FIG. 1, the composite video output from the receiver's demodulator, comprising at least chrominance and luminance information-bearing signals, is coupled to the input of a video buffer. A primary function of the buffer is to provide a low impedance output thereby maintaining the desired isolation among the circuits to which portions of the composite video signal are to be distributed. The output of the buffer is coupled in parallel to, inter alia, the luminance and chrominance signal channels, the chrominance signal being coupled through a frequency-selective chrominance take-off network to the input of the chrominance channel. In a manner well known to those skilled in the art of color television design, the respective luminance and chrominance signal are appropriately processed, recombined, and ultimately coupled to the receiver's CRT.

The chrominance take-off circuit of the subject invention includes a series-capacitive branch, comprising a resistor R1 and a capacitor C1, coupled between the output of the video buffer and one end of an inductive branch, inductor L1. The other end of L1 is connected to a source of DC reference potential, in this case circuit ground. A first capacitive branch, capacitor C2, is connected between the junction of the resistive-capacitive and inductive branches and to one end of a second capacitive branch, capacitor $C_S$. The other end of $C_S$ is connected to a parallel RLC branch comprising a resistor $R_P$, an inductor $L_P$ and a capacitor $C_P$. The RLC branch is in turn connected to ground. The output of the chrominance take-off network, at the junction of C2 and $C_S$, is coupled through a resistor R2 to the input of the chrominance channel. The value of R2 and the input resistance of the chrominance channel are typically chosen to have a value sufficiently great so as not to affect the take-off network frequency response. Typical values for the network described above are:

R1 = 470 ohms
C1 = 27 pf
L1 = 47 uh
C2 = 12 pf
$C_S$ = 150 pf
$L_P$ = 39 uh
$C_P$ = 56 pf
$R_P$ = 1.5 K ohms.

Typical prior art take-off networks were of similar structure with the most notable exception being the exclusion of $C_S$. That is, C2 would be connected directly to the RLC branch and the output of the take-off network would appear at the junction of C2 and that branch. The frequency response of the subject take-off network is graphically presented in FIG. 2A. The response at the middle of the chrominance band, at the chrominance subcarrier frequency, 3.58 MHz, is approximately −1.0 db; that is, 1.0 db below the peak response. The response at the low end, 3.1 MHz, and at the high end, 4.1 MHz, of the band are approximately −1.0 and −6.0 db respectively. In a manner well known to those skilled in the art, the chrominance response is designed so as to compensate for the characteristics of the IF. Note that the response at a frequency equal to approximately one-half the chrominance subcarrier frequency, 1.8 MHz, is attenuated 44 db and that a transmission zero occurs at that frequency. The response on either side of 1.8 MHz is greater than the response at 1.8 MHz. Notice that the response of a prior art take-off network within the chrominance bandwidth is substantially identical, a minor difference being the response at 3.58 MHz: −0.5 db. The significant difference however is that the response at 1.8 MHz is only −35 db and that no transmission zero occurs at that point. The analysis below will indicate the manner in which nearly 10 db greater attenuation was obtained at 1.8 MHz while maintaining the response within the chrominance band substantially in tact, at the expense of a single additional capacitive element.

Central to the operation of the take-off network is the impedance presented by the parallel RLC branch within the chrominance bandwidth and at 1.8 MHz and the interaction of that branch with the series-connected capacitive branch, $C_S$. As can be computed from the values given above the nominal (parallel) resonant frequency, $f_o$, of the RLC branch is approximately 3.40 MHz, slightly below the chrominance subcarrier frequency. The Quality Factor, Q, at that frequency is equal to approximately 1.8 ($Q = R_P/2\pi f_o L_P$). By definition, at resonance the impedance of $L_P$ is equal to the impedance of $C_P$ and the net impedance of the RLC branch is approximately equal to $R_P$, purely resistive.

However, at frequencies, $f_x$, below the resonant frequency the impedance of $L_P$ will be less than the impedance of $C_P$, and as shown in FIG. 3A, the RLC branch will degenerate into the parallel combination of $R_P$ and a net inductance, $L_x$. At $f_x = 1.8$ MHz, $L_x$ can be shown to have a value of 54.1 uh. However, as is well known, at a given frequency, a parallel RL network represented by a resistor $R_P$ and an inductor $L_x$ is equivalent to a series RL network, as shown in FIG. 3B, with an inductor, Ls, equal to $$L_x \left[ \frac{Q^2}{1 + Q^2} \right]$$

and a resistor, $R_S$, equal to $R_P/(1+Q^2)$. Since the Q of the parallel network shown in FIG. 3A can be computed to be 2.55, it follows that these values are approximately 46.9 uh and 200 ohms respectively. At a given frequency below $f_o$, $C_S$ can be selected to be (series) resonant with $L_S$. Resonance occurs, of course, at a frequency approximately equal to $\frac{1}{2}\pi(L_S C_S)^{\frac{1}{2}}$. With the standard value capacitance for $C_S$ given above (150 pf) resonance occurs at approximately 1.8 MHz. The network further degenerates into the one shown in FIG. 3C and a transmission zero results at that point. Notice that the equivalent net resistance at $f_x$ is nearly an order of magnitude lower than the net resistance at $f_o$ thereby improving the attenuation of the 1.8 MHz luminance signal. Also, the resulting value of $C_S$ is more than an order of magnitude greater than the value of C2 and its impedance at $f_o$, approximately 300 ohms reactive, is sufficiently less than $R_P$ so as to have a minimal effect on the chrominance bandpass response. At this point it might be noted that prior art take-off networks often require a coupling capacitor (not shown in FIG. 1) in series with R2 at the input of the chrominance processing circuitry. $C_S$ obviates the need for such a capacitor.

The above discussion has been at least implicitly addressed to a parallel resonant frequency at or near the chrominance subcarrier frequency and a frequency of zero transmission at approximately one-half that frequency. However, the general expression for the net inductance of a parallel resonant circuit at a frequency, $f_x$, below resonance is $$L_x = \frac{L_P}{1 - \left( \frac{f_x^2}{f_o^2} \right)}.$$

Given the condition that at resonance, either series or parallel, the capacitive reactance must be equal to the inductive reactance of the resonant circuit, it follows from the equation immediately above that the desired theoretical value of $C_S$ is approximately given by the expression $$C_s = \left( \frac{1}{4\pi^2} \right) \left( \frac{1}{L_P} \right) \left[ \frac{1}{f_x^2} - \frac{1}{f_o^2} \right].$$

(This expression is approximate to the extent that the Q of the parallel inductive-resistive branch, $L_x$ and $R_P$, is less than infinite. For Qs greater than 3 or 4, the expression is accurate to within about 10 percent. For Qs greater than 10, the expression is substantially exact, and the accuracy of the value of $C_s$ will be limited by the tolerances of commercially available capacitors.) In a case as here, where it is desired to maximally attenuate a frequency whose second harmonic is at or near the frequency of maximum transmission, $f_o$, the expression for $C_s$ reduces to:

$$C_s = \frac{3}{4\pi^2} \frac{1}{L_P} \frac{1}{f_o^2},$$

or alternatively $$C_s = \frac{3}{16\pi^2} \frac{1}{L_P} \frac{1}{f_x^2},$$

where $L_P$ is the inductance of parallel resonant circuit, $f_o$ is the resonant frequency of the circuit, and $f_x$ is the frequency of maximum attenuation.

In summary, the subject take-off network effects approximately an order of magnitude increase in the attenuation of luminance signals through the addition of a single capacitive branch. The value of capacitance required can be accurately and simply defined by the desired frequencies of maximum and minimum transmission response and by the inductance of the parallel RLC branch. In particular, it has been found advantageous to effect maximum attenuation at frequencies equal to approximately one-half the chrominance subcarrier frequency, thereby suppressing (second) harmonics of luminance signal. Furthermore, although the network has been described in the environment of chrominance circuitry, it is obvious that it has applicability elsewhere. This is clearly indicated by the inherent generality of the expressions taught for determining the capacitance required in the capacitive branch.

Accordingly, while there has been shown and described what are at present considered the preferred embodiments of the invention, it will be obvious to those skilled in the art that various changes and modifications may be made therein without departing from the scope of the invention as defined by the appended claims.

What is claimed is:

1. A chrominance take-off circuit comprising:
    a first capacitive branch, coupled at a first end to the output of the video channel and to the input of the chrominance processing circuitry, and
    a parallel RLC branch coupled at one end to the other end of the capacitive branch and at the other end to a reference potential, said parallel branch resonant at approximately the chrominance subcarrier frequency.

2. A circuit as defined in claim 1 wherein at a predetermined frequency within the luminance bandwidth the RLC branch is equivalent to a series-connected inductance and resistance, and the inductance is characterized by an impedance the magnitude of which is substantially equivalent to the magnitude of the impedance of the first capacitive branch at the predetermined frequency so that a transmission zero is effected at the predetermined frequency whereby luminance signals at that frequency are maximally attenuated.

3. A circuit as defined in claim 2 further comprising:
    a resistive-capacitive branch coupled at one end to the output of the video channel;
    an inductive branch coupled at one end to the other end of the resistive-capacitive branch and at the other end to the reference potential; and
    a second capacitive branch coupled at one end to the junction of the resistive-capacitive branch and the inductive branch and at the other end to the first end of the first capacitive branch.

4. A circuit as defined in claim 3 where the predetermined frequency is approximately 1.8 MHz.

5. A circuit as defined in claim 4 wherein the Q of the RLC branch at the chrominance subcarrier frequency is approximately 1.8.

6. A circuit as defined in claim 5 wherein the capacitance of the first capacitive branch is at least ten times the capacitance of the second capacitive branch so that the magnitude of the impedance of the first capacitive branch, at both 1.8 MHz and 3.58 MHz, is less than one-tenth the magnitude of the impedance of the second capacitive branch at those frequencies.

7. In a chrominance take-off circuit including a parallel RLC branch resonant at approximately the chrominance subcarrier frequency and at a predetermined frequency in the luminance channel bandwidth, equivalent to a series-connected inductance and resistance, an improvement comprising a capacitive branch connected at one end to the RLC branch, said capacitive branch characterized by an impedance the magnitude of which impedance at the predetermined frequency is equal to the magnitude of the impedance of the inductance so that a transmission zero is effected at that frequency.

8. A circuit as defined in claim 7 wherein the predetermined frequency is 1.8 MHz.

9. A circuit as defined in claim 7 wherein the capacitive branch comprises a capacitor the approximate value of which is given by the equation $$C = \left(\frac{1}{4\pi^2}\right)\left(\frac{1}{L_P}\right)\left[\frac{1}{f_x^2} - \frac{1}{f_o^2}\right],$$

where $f_o$ is the resonant frequency of the RLC branch, $f_x$ is the predetermined frequency, and $L_P$ is the value of these inductors in the RLC branch.

10. A circuit as defined in claim 7 wherein $f_x$ is approximately equal to one-half $f_o$ so that C is given by the equation:

$$C = \left(\frac{3}{4\pi^2}\right)\left(\frac{1}{L_P}\right)\left(\frac{1}{f_o^2}\right).$$

11. A circuit as defined in claim 10 wherein the parallel RLC branch is so arranged and constructed as to have a resonant frequency of approximately 3.40 MHz and a Q at that frequency of approximately 1.8.

12. A circuit as defined in claims 7, 8 or 9 wherein the capacitive branch and parallel RLC branch are so arranged and constructed as to effect the following frequency response, stated with respect to a peak response occurring at a frequency between 3.58 MHz and 4.1 MHz:
    (a) approximately 1.0 db attenuation at 4.1 MHz,
    (b) approximately 1.0 db attenuation at 3.58 MHz, and (c) approximately 6.0 db attenuation at 3.1 MHz, and (d) approximately 44 db attenuation at the predetermined frequency.

13. A circuit as defined in claim 12 wherein the parallel RLC branch is so arranged and constructed as to be the equivalent of a series-connected resistance and inductance at the predetermined frequency, said resistance and inductance characterized by a Q of approximately 2.55 at that frequency.

14. A chrominance take-off circuit comprising:

a series resistive-capacitive branch coupled at one end to the output of a video buffer;

an inductive branch connected between the other end of the resistive-capacitive branch and a source of reference potential;

a first capacitive branch connected at one end to a junction of the resistive-capacitive and inductive branches;

a second capacitive branch, $C_s$, connected at one end to the other end of the first capacitive branch; and a parallel RLC branch connected between the other end of the second capacitive branch and the source of reference potential wherein the parallel RLC is parallel resonant at a frequency $f_o$ and is equivalent to a net inductance, $L_x$, at a frequency below $f_o$ and wherein the impedance at $f_x$ of the $C_s$ branch is equal to the impedance of the series equivalent of $L_x$, $L_s$, at $f_x$ so that $C_s$ and $L_s$ are series resonant at $f_x$.

* * * * *